United States
Youngs

[11] 3,857,275
[45] Dec. 31, 1974

[54] SHOCK ABSORBER TESTING MACHINE

[76] Inventor: Homer S. Youngs, 8718 Dunaway Dr., La Jolla, Calif. 92037

[22] Filed: Dec. 4, 1972

[21] Appl. No.: 312,054

[52] U.S. Cl. .................................... 73/11, 73/70
[51] Int. Cl. ........................................ G01m 17/04
[58] Field of Search............ 73/11, 70, 1 DV, 71.7; 33/141 R, 141 E, 141 F, 141.5, 125 M

[56] References Cited
UNITED STATES PATENTS

| | | | |
|---|---|---|---|
| 1,714,009 | 5/1929 | Farmer............................ | 33/141 R |
| 1,891,613 | 12/1932 | Widney........................... | 73/11 UX |
| 3,201,979 | 8/1965 | Massa et al. ................... | 73/70 |
| 3,203,230 | 8/1965 | Reiser............................. | 73/70 |
| 3,629,557 | 12/1971 | Lareau........................... | 33/141 E X |
| 3,724,082 | 4/1973 | Culver............................ | 33/141 E |

FOREIGN PATENTS OR APPLICATIONS

| | | | |
|---|---|---|---|
| 470,540 | 6/1914 | France............................ | 33/141.5 |

*Primary Examiner*—Charles A. Ruehl
*Attorney, Agent, or Firm*—Lyon & Lyon

[57] ABSTRACT

A machine for testing automobile shock absorbers which includes a portable structure having an indicator wheel that may be pressed against a fender or other suitable place at the side of an automobile. Rotation of the wheel as the adjacent part of the automobile is depressed, then released operates, through a drive connection, a stylus which marks the movement on a traveling sheet of paper. The indicator wheel is mounted on a yieldable arm permitting horizontal displacement, and the drive connection between the indicator wheel and its stylus is so arranged that such horizontal displacement does not cause the wheel to turn so that the surface engaged by the wheel may slope substantially yet have no effect on the stylus movement.

6 Claims, 7 Drawing Figures

PATENTED DEC 31 1974 3,857,275

SHOCK ABSORBER TESTING MACHINE

BACKGROUND OF THE INVENTION

Various attempts have been made to devise testing machines for shock absorbers. These have included use of a platform onto which the vehicle to be tested is driven, as exemplified in U.S. Pat. No. 3,383,909; a jack mechanism arranged to lift a corresponding wheel, as exemplified in U.S. Pat. Nos. 2,923,147 and 3,030,796; or a bumper clamping means, as exemplified in U.S. Pat. No. 3,164,003. Each of these prior machines also include expensive and complex sensing means.

SUMMARY OF THE INVENTION

The present invention is directed to a shock absorber testing machine which is substantially less expensive than prior apparatus for this purpose, and is easier to operate, yet is dependable, this invention being summarized in the following objects:

First, to provide a shock absorber testing machine which includes a novel measuring or indicating wheel arranged to be placed in rolling contact with a vehicle to be tested and connected by a cord drive to a stylus for tracing a graph on an underlying paper or cord, the indicating wheel and stylus being activated when the vehicle is manually pressed downward and released.

Second, to provide a shock absorber testing machine which incorporates a novel mounting means for the measuring wheel so arranged that the mounting wheel drives the stylus in response to movement in a preselected plane, such as a vertical plane, and has no appreciable effect on the stylus in response to movement in an angularly related plane, such as a horizontal plane, whereby the wheel when in contact, for example with a sloping vehicle body element such as a fender, causes the stylus, for example, to record only the vertical movement.

Third, to provide a shock absorber testing machine mounted on a wheeled cart which merely is moved until the indicator wheel is in nominal pressure contact with a selected portion of a vehicle sidepanel, whether such portion be vertical or sloping, whereupon an operator by merely momentarily pressing downward manually on an adjacent portion of the vehicle, then suddenly releasing the pressure, produces motion which is snubbed by the corresponding shock absorber and recorded by the stylus.

Figure 5:
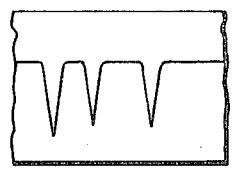
FIGS. 5, 6 and 7 indicate typical records produced by the testing machine.

The shock absorber testing machine includes a housing 1 which may be essentially rectangular and includes a side extension 2. Supported by a pair of pivots 3 defining a horizontal axis is an arm 4 which depends from the extension 2. The depending arm is urged outwardly from the housing 1 by means of a thrust unit 5 including telescoping members and a spring. Outward movement of the arm 4 is limited by a suitable stop 6. Rotatably mounted at the lower end of the depending arm 4 is an indicator wheel 7.

The housing 1 is provided with a pair of transverse openings 8 and 9 separated by a web 10. Within the housing below the side margins of the openings is a pair of partitions 11 which support a paper roll 12 therebetween. The paper roll is provided with a shaft 13 which is received in slots 14 formed in the partition.

Also rotatably mounted between the partitions is a drive roller 15 which is rotated by a suitable electric motor, not shown. For convenience, the motor is preferably operated by dry cell batteries, also not shown, contained within the housing. Engaging the drive roller 15 is a pair of retainer rollers 16 mounted on a frame 17 pivotally supported by a shaft 18. The paper from the roll 12 is passed between the drive roller 15 and retainer rollers 16 so as to cover the upper side of the drive roller. The paper may be retained by the weight of the rollers 16 and, if desired, a spring, not shown, may supplement the retainer rollers.

The transverse opening 9 is provided with a web 19, the lower edge of which is serrated to form a cutoff edge 20.

Extending longitudinally within the housing 1, in alignment with the depending arm 4 and the indicator wheel 7, is a J-shaped guide member 21, supported near the top of the housing and extending between the partitions 11. The guide member 21 is suitably supported by mounting members 22. Supported from the guide member 21 by means of end fittings 23 is a slide supporting rod 24. The rod 24 receives a slide 25 which carries a stylus 26.

Figure 4:
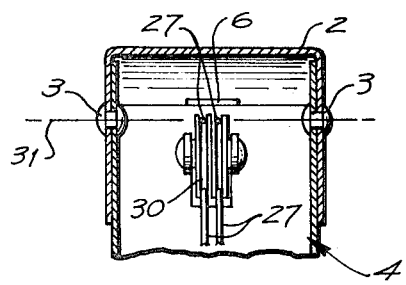
FIG. 4 is an enlarged fragmentary sectional view taken through 4—4 of FIG. 2.

The indicator wheel 7 and the stylus 26 are connected by a drive cord 27. The drive cord is wrapped about a drive sheave 28 secured to the indicator wheel 7. The cord extends in two reaches from the drive sheave, one reach passing over a pulley 29, carried by the depending arm 4, to bring the two reaches into proximity. The two reaches pass over a pair of pulleys 30. These pulleys are so positioned that the two reaches of the cord pass through an axis defined by the pivots 3, indicated by 31 in FIG. 4. Both reaches of the drive cord are received in the lower portion of the J-shaped guide member 21. Both reaches are attached to the slide 25; however, on reach continues to the far end of the guide member 21 and passes around a pair of pulleys 32, then back to the slide 25. Rotation of the indicator wheel 7, in one direction, moves the slide 25 and its stylus 26 in one direction, whereas rotation in the opposite direction causes opposite movement of the slide and stylus.

The housing 1 is supported by a pair of telescoping posts 33 and 34. The inner post 33 is provided with a series of perforations 35 and the outer post is provided with a single pair of perforations which receive a pin 36 so that the housing may be supported at various heights to accomodate a variety of vehicles and to avoid irregularities in the vehicle surface. The lower supporting post 34 is secured to a platform 37 which is provided with a pair of wheels 38 and a foot 39. A suitable handle 40 for manipulating the platform is also provided.

Figure 6:
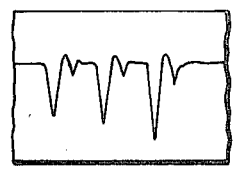
Figure 7:
Figure 1:
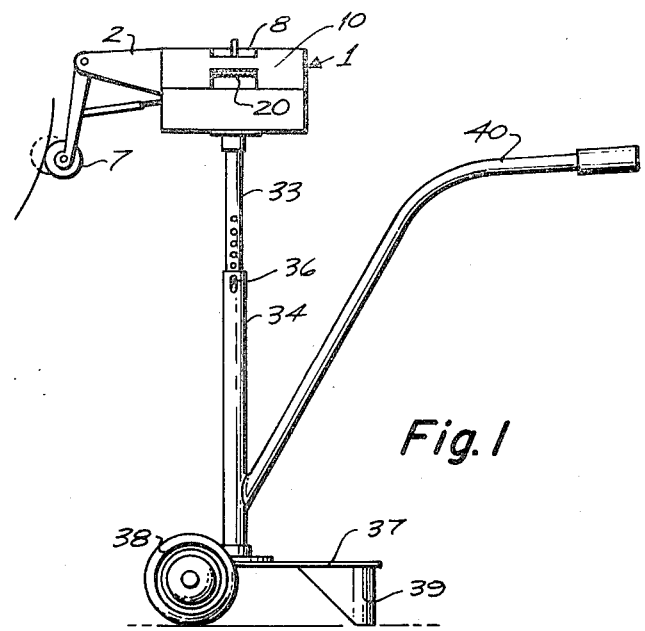
FIG. 1 is a side view of the shock absorber testing machine positioned for engagement with a side of a vehicle body.
Figure 2:
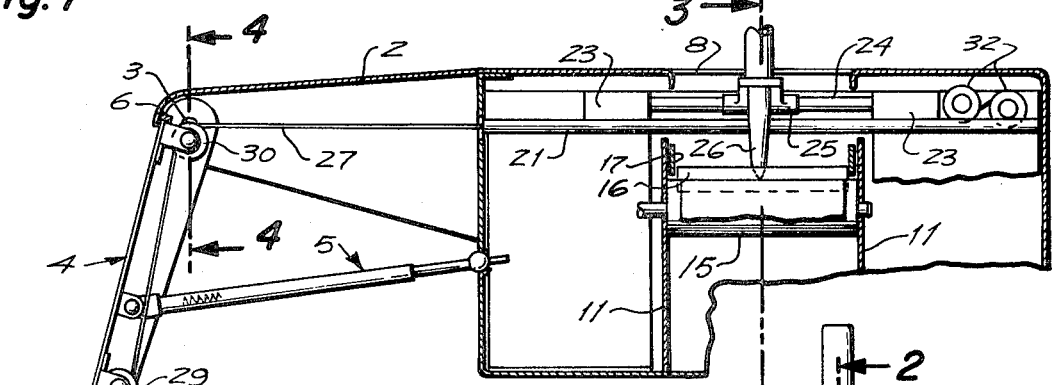
FIG. 2 is an enlarged longitudinal sectional view taken in part in the plane 2—2 of FIG. 3.
Figure 3:
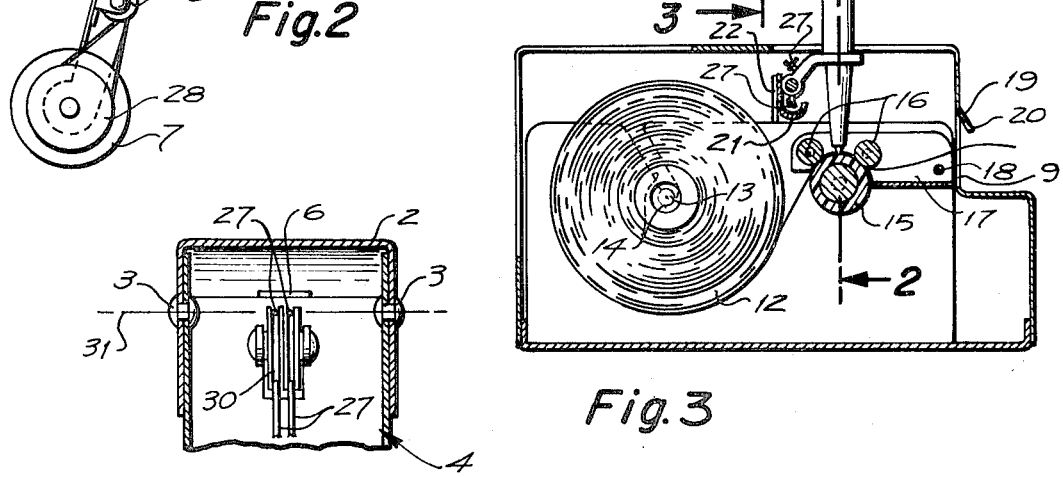
FIG. 3 is a transverse sectional view taken through 3—3 of FIG. 2.

Operation of the shock absorber testing machine is as follows:

The testing machine is wheeled into position alongside a vehicle having shock absorbers. Usually, the vehicle is provided with four shock absorbers, one near each wheel; therefore, the machine is brought into positions alongside the vehicle wheels and the height is adjusted so that the indicator wheel 7 engages the vehicle fender near the wheel. The drive roller 15 is then started so as to advance the paper under the stylus. The fender is then pressed downward manually and released, permitting the vehicle to rebound along an essentially vertical axis. If the adjacent shock absorber is in excellent condition, the rebound will be so dampened that only one peak is formed with each manual depression of the fender, as indicated in the chart shown in FIG. 5. More typically, however, there may be a slight overtravel, as indicated by the small dip following the initial movement, as shown in FIG. 6. If ths shock absorber is in poor condition, the chart shown in FIG. 7 is typical; that is, the vehicle will oscillate several times with dimishing amplitude.

It is possible to test a pair of shock absorbers simultaneously by placing the testing machine at the front or back of the vehicle at a mid-station. It is preferred, however, to make individual tests of the shock absorbers.

It is not necessary that a vertical side of the vehicle must be found, for pivotal movement of the indicator wheel about the horizontal axis 31 produces no significant effect on the drive cord 27 or the stylus 26. While it is preferred to have the stylus completely insensitive to pivotal movement of the depending arm 4, slight movement of the stylus under such condition may be tolerated. Also, the axis of the indicator wheel 7 is sufficiently close to the vertical plane passing through the axis of the pivots 3 so that pivoting of arm 4 about pivots 3 produces no significant vertical displacement of the indicator wheel 7. Thus, the indicator wheel remains at a substantially fixed elevation above the supporting surface on which the apparatus is placed. Tests have indicated that the contacted region of the vehicle may slope rather substantially in either direction and, in fact, even if the engaged part of the vehicle forms, in effect, an obtuse rib, the wheel may rotate over the apex thereof without affecting the tests results.

More specifically, while the wheel rotates a slightly increased amount as it moves over a curved surface the increase is not significant as it merely changes slightly the amplitude of the recorded curve, not the pattern. In fact the force manually applied to the fender is a much greater variable, yet does not change the pattern of the recorded curve.

It will be observed that the vertical movement of the indicator wheel as it pivots about the axis of the arm 4 is negligible as the angular position of the arm with respect to the vertical plane is small.

The force with which the indicator wheel engages the vehicle surface is less than the force required to drag the foot 39 over an underlying surface, so that no securing of the platform and housing is required.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A vehicle shock absorber testing machine, comprising:
    a. a movable supporting structure including a yieldable member movable in an essentially horizontal direction, the yieldable member terminating in an indicator wheel;
    b. the supporting structure being manually movable into a position adjacent a side of a vehicle having shock absorbers to be tested until the indicator wheel is in bearing contact with the vehicle side, for rolling movement when the vehicle side is depressed, and then permitted to rebound;
    c. a recording means carried by the supporting structure and including a movable stylus;
    d. and a drive means interconnecting the wheel and stylus to cause recording movement when the wheel rotates in response to depression and rebound of the vehicle side.

2. A testing machine as defined in claim 1, wherein:
    a. the drive means includes a cord connecting the wheel to the stylus and guide means therefore, certain guide means being so disposed with respect to the yieldable member that movement of the yieldable does not cause rotation of the indicator wheel whereby the region of the vehicle side engaged by the indicator wheel need not be vertical.

3. A testing machine as defined in claim 1, wherein:
    a. the yieldable member is a pivoted arm, movable in an arc, the radius of which is substantially closer to the vertical axis than to the horizontal axis, whereby movement of the indicator wheel due to angular movement of the arm is essentially horizontal;
    b. and the drive means includes a cord connecting the indicator wheel and the stylus and passing in proximity to the pivotal axis of the arm thereby minimizing movement of the stylus due to pivotal movement of the arm, whereby the region of the vehicle side engaged by the indicator wheel may depart from the vertical without significant effect on the record produced by the stylus.

4. A vehicle shock absorber testing machine, comprising:
    a. a supporting structure including a wheeled base also having means for resisting movement, when the supporting structure is at rest, a recording unit vertically adjustable with respect to the base, and a pivoted arm, the extremity of which is yieldable along essentially a horizontal axis;
    b. the recording unit including a roll of recording paper, drive means therefor, a stylus for marking on the paper and means for supporting the stylus for movement relative to the paper;
    c. an indicator wheel carried by the arm and adapted to be positioned by the supporting structure for contacting a region of a vehicle side capable of being momentarily depressed to compress a shock absorber, then subject to subsequent return movement;
    d. and a drive means connecting the indicator wheel and stylus.

5. A testing device for a vehicle having sides which curve laterally with respect to a vertical plane, the testing device measuring movement of the vehicle resulting from response of the vehicle's springs and shock absorbers to momentary downwardly applied force and subsequent release; said testing device comprising:

a. an indicator wheel;
b. means supporting the indicator wheel at a substantially fixed elevation above a supporting surface and for rotation about a horizontal axis for translatory movement along an essentially horizontal path, generally perpendicular to the wheel's axis, without significant displacement in a vertical direction and including yieldable means for urging the indicator wheel against a side of the vehicle; whereby, upon depressing and releasing the vehicle, any departure of the contacted area of the vehicle side from the vertical displaces the wheel without significant rotation, whereas the vertical component of movement of the contacted area causes rotation of the wheel about its horizontal axis;
c. and means responsive to rotation of the wheel in both directions for indicating the extent of vertical oscillations of the vehicle body.

6. A testing device as defined in claim 5, wherein:
a. the supporting means includes a swingable arm carrying the wheel;
b. and the responsive means includes transmitting means extending along the yieldable arm, and a recording means activated by the transmitting means.

* * * * *